G. H. TAGGART.

STOP MECHANISM FOR PHONOGRAPHS.

APPLICATION FILED JULY 17, 1914.

Reissued Oct. 13, 1914.

13,809.

2 SHEETS—SHEET 1.

WITNESSES

Thos. B. Fayet.

Alice A. Pill

INVENTOR

George H. Taggart by Dannis B. Wolcott

Atty

G. H. TAGGART.

STOP MECHANISM FOR PHONOGRAPHS.

APPLICATION FILED JULY 17, 1914.

Reissued Oct. 13, 1914.

13,809.

2 SHEETS—SHEET 2.

WITNESSES

Thos. B. Joyce

Alice A. Tuff

INVENTOR

George H. Taggart by Dennis S. Wolcott

Atty

UNITED STATES PATENT OFFICE.

GEORGE H. TAGGART, OF NEW YORK, N. Y.

STOP MECHANISM FOR PHONOGRAPHS.

13,809. Specification of Reissued Letters Patent. Reissued Oct. 13, 1914.

Original No. 1,080,386, dated December 2, 1913, Serial No. 645,060. Application for reissue filed July 17, 1914. Serial No. 851,643.

*To all whom it may concern:*

Be it known that I, GEORGE H. TAGGART, a citizen of the United States, formerly residing at Buffalo, in the county of Erie and State of New York, but now residing in New York, county and State of New York, have invented a new and useful Improvement in Stop Mechanism for Phonographs, of which the following is a specification.

This invention relates to mechanisms for automatically stopping the motion of phonographs, graphophones, or analogous mechanical musical instruments, when the stylus or needle of the instrument reaches the end of the record.

The objects of the invention are to produce a practical and efficient stop mechanism of simple and durable construction for phonographs of that type in which the record is formed on a flat rotary disk; and also to provide a stop mechanism for phonographs and analogous instruments which can be readily set or adjusted so as to stop the movement of the record carrier at any desired point of the record, *i. e.*, when the stylus or needle has reached the end or an intermediate part of the record.

Figure 1:
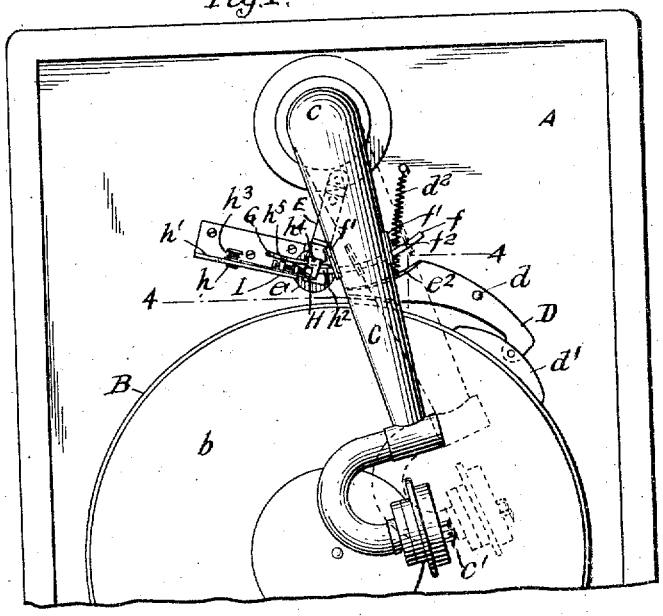
Figure 2:
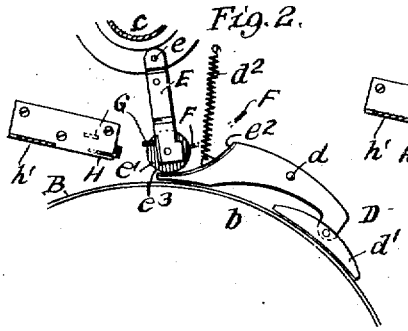
Figure 3:
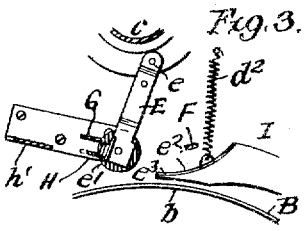
Figure 5:
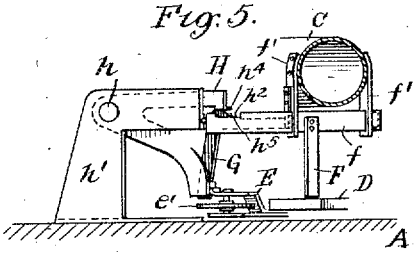
Figure 6:
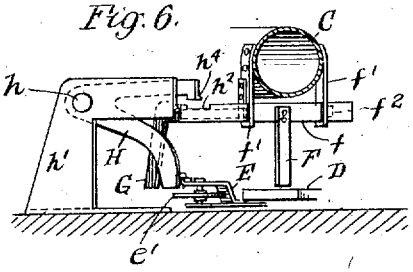
Figure 8:
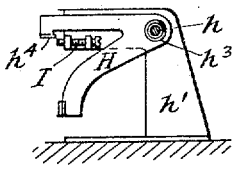
Figure 7:
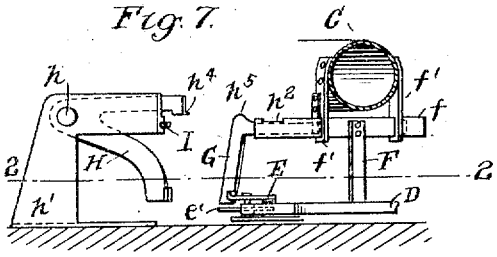
Figure 9:
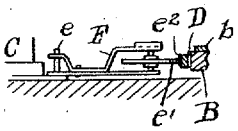

In the accompanying drawings Figure 1 is a fragmentary plan view of a phonograph provided with a stop mechanism embodying the invention. Fig. 2 is a fragmentary sectional plan view thereof on line 2—2 Fig. 7, showing the stop mechanism. Fig. 3 is a similar plan view, showing a different position of the parts. Figs. 4, 5, 6 and 7 are fragmentary sectional elevations on line 4—4 Fig. 1, showing the parts in some of the different positions which they occupy during the operation of the mechanism. Fig. 8 is an elevation of the latch of the stop mechanism. Fig. 9 is a fragmentary elevation showing the brake releasing arm.

Like reference characters refer to like parts in the several figures.

The invention is shown in the drawings and described as applied to a phonograph provided with a flat record disk, but it will be understood that the stop mechanism could be readily adapted for use with machines of other types.

A represents the usual box or casing of the machine, B the rotary table on which the record disk $b$ is supported and C the needle arm which is pivoted at $c$ to swing horizontally over the table B, and carries at its end the usual sound producing device provided with a stylus or needle $c'$ adapted to follow the spiral groove on the surface of the record disk $b$. All of these parts may be of the usual or any suitable construction.

D represents a brake adapted to bear against the rotary table for stopping it. The brake shown consists of a lever pivoted at $d$ on the stationary casing of the machine, and having a brake shoe $d'$ pivoted on one arm. A spring $d^2$ attached to the opposite arm of the lever tends to swing the lever on its pivot so as to press the shoe against the edge of the rotary table B. As the brake is at all times subjected to pressure tending to cause it to engage the record carrier, provision is made for holding the brake in release position. The mechanism employed for holding the brake in release position should be so constructed as to permit the brake to be shifte by its spring as soon as the stylus has reached a predetermined point of the record, thereby preventing any substantial lateral movement of the sounding arm after such point has been attained. A construction suitable for use to this end consists of a part or member having one end free to swing on a stationary pivot, and a second member pivoted to the first member and adapted to bear upon the brake lever. This mechanism is so constructed and arranged that when a line passing through the axes of movement of the two members intersects the brake lever, they will form a practically rigid brace between the stationary pivot and the brake lever holding the latter in release position. But when this mechanism is so shifted by the lateral swing of the sound arm, that one of the points above mentioned is moved the slightest degree out of line with one or both of the other points, there will be a collapse of the brace and the brake lever can be shifted by its spring. A convenient form of such mechanism consists of an arm E pivoted at $e$ and provided at its outer end with a wheel or roller $e'$ adapted to bear on a brake lever D, and hold the shoe $d'$ away from the record carrier. The portion $e^2$ of the brake lever engaged by the wheel or roller is preferably curved substantially concentric with the pivotal point of the arm E, so as to permit considerable lateral movement of the arm without damaging the position of the brake lever. The brake lever D and the releasing arm E are so located with regard to each other that when the wheel $e'$ rides onto the curved face $e^2$ the brake shoe will be moved out of contact with the rotary table against the action of the spring $d^2$. The end $e^3$ of the curved face $e^2$ is slightly raised or eccentric which prevents the roller from accidentally rolling off of the brake lever so that a slight force is required to disengage the releasing arm from the brake lever and apply the brake. The releasing arm E and the wheel $e'$ together act as a toggle mechanism and when operating permit of the application of the brake, the pivotal axis of the arm, the axis of the wheel and the end of the brake lever, which as stated is preferably provided with a thin raised or eccentric portion $e^3$, will remain in line and form a rigid brace until the arm and wheel are shifted laterally. It will be observed by reference to Fig. 2 that as long as the wheel is in engagement with the lever the point of bearing of the lever on the wheel will coincide with a line passing the pivotal axes of the wheel and arm, but as soon as said line moves to the left of the point of wheel and brake lever, the pressure of the end of the lever will snap the arm farther to the left and entirely clear of the brake lever. The brake may be of other construction adapted to be released and applied by the movement of the releasing arm into and out of engagement therewith.

The brake releasing arm is adapted to be moved out of and into engagement with the brake lever for applying and releasing the brake by fingers F and G which depend from the needle arm at opposite sides of the releasing arm. When the needle arm is moved outwardly or toward the edge of the record disk to commence a reproduction the finger G moves the releasing arm in the direction to release the brake and in the inward movement of the needle arm when the stylus reaches the end of the record, the other finger F moves the releasing arm in the direction to release the brake lever. The finger F is adjustable on the needle arm so that it can be set on each record so as to apply the brake when the stylus reaches the end of the record, regardless of the point on the record disk at which the record terminates, or any other predetermined point of the record. In the construction shown the finger F depends from a slide or bar $f$ which is arranged to slide in guide-pieces $f'$ which are suitably secured to and depend from the needle arm C. The slide is curved substantially concentric with the pivot of the needle arm. A suitable spring $f^2$ secured to one of the guides $f'$ and pressing against the bar $f$, offers sufficient frictional resistance to the movement of the bar to enable the finger F to move the wheel of the brake releasing arm off of the brake lever and permit the spring $d^2$ to apply the brake and stop the rotation of the table B. The other finger G, which is substantially L-shaped is rigidly secured at one end to one of the depending guides $f'$ on the needle arm.

H represents a latch which is pivoted at $h$ on a suitable stationary support $h'$ on the casing of the instrument, and has an arm which extends toward the end of the finger slide and is provided with a hooked end adapted to enter a notch $h^2$ in the end of slide $f$ for holding the slide stationary. When the latch is in engagement with the slide $f$ it will hold the finger F stationary when the needle arm C is swung outwardly, the slide being adapted to move lengthwise in its guides $f'$. The latch H is pressed against the support $h'$ by a suitable spring $h^3$, so that the latch will be held by friction in any position to which it is moved. The latch H has a lateral extension $h^4$ which extends into the path of movement of a cam face $h^5$ on the upper edge of the finger G and is adapted to be moved upwardly thereby to move the latch out of engagement with the finger slide $f$. The latch H also has a depending arm which extends into the path of movement of the brake releasing arm E by which it is adapted to be struck and moved to place the hooked end of the latch into engagement with the finger slide.

I represents an adjustable screw or device against which the end of the finger slide $f$ is adapted to abut. This screw is adjustable toward and from the finger slide and should be so adjusted that when the end of the finger slide $f$ engages the end of the screw, the depending finger F thereof will just have moved the brake releasing arm out of engagement with the brake lever, thereby applying the brake.

Figure 4:
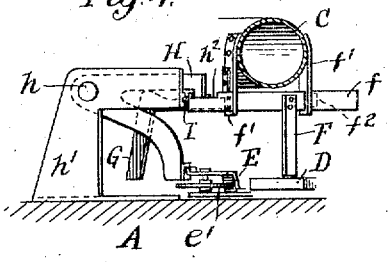

The operation of the stop mechanism is as follows: In Figs. 1, 3 and 4, the parts of the mechanism are shown in the positions which they occupy after the finishing of a record and while in this position, another record may be placed on the rotary table B. In order to adjust the mechanism to stop at the end or any desired point of the new record, the needle arm is moved toward the outer edge of the disk, and since the latch H engages the finger slide, the slide will be held stationary until the cam face $h^5$ on the finger G engages the lateral extension $h^4$ of the latch and disengages the latch from the slide, as shown in Fig. 5. The finger F is thus shifted toward the left side of the needle arm, as viewed in Fig. 5. The needle arm is then swung inwardly toward the center of the disk until the stylus or needle is at the point at which it is desired to stop the instrument, *e. g.*, at the end of the record. When the needle arm is thus moved inwardly, the finger slide $f$ is held from movement by the adjustable screw I with the finger F in the position at which it will strike the releasing arm to apply the brake in the automatic action of the mechanism, and during the continued inward movement of the needle arm the finger slide is shifted relative thereto, more or less, depending upon the extent of the inward adjustment of the needle arm necessary to move the stylus to the inner end or other point of the record. Consequently in the operation of the instrument in reproducing the record, the stylus must traverse the record to the point to which it was set in order to bring the finger F to the position to actuate the releasing arm E and apply the brake. Fig. 6 shows the position of the parts when the stylus has been set on the point at which the instrument is to be stopped. It is now only necessary to move the needle arm C outwardly to place the stylus at the outer edge or starting point of the record. During this movement the brake releasing arm E will be engaged by the rigid finger G and moved onto the curved face of the brake lever, as shown in Figs. 2 and 7, thereby releasing the brake and permitting the rotary table to be revolved by its driving spring or power. The wheel of the releasing arm is retained on the curved face of the brake lever by the raised or eccentric end $e^3$ thereof. When the stylus, in traversing the record in the operation of the instrument, reaches the point to which it was set, the finger F will be brought to the position indicated in dotted lines in Fig. 2 and will shove the brake releasing arm out of engagement with the brake lever, the brake being thereupon applied by its spring $d^2$. The wheel $e'$ of the brake releasing arm, when rolling out of engagement with the brake lever is snapped away from the lever and caused to move faster than the sound arm and the brake will be applied regardless of any further lateral movement of sound arm. In other words as soon as the stylus reaches the predetermined point of the record the operation of the brake is wholly independent of the sound arm and its application is practically instantaneous. The push imparted to the release arm as the wheel passes off of the brake lever causes it to strike the downwardly depending arm of the latch H and move the latch into holding engagement with the finger slide, as shown in Fig. 4, so that the mechanism is again ready to be set for another record.

The stop mechanism is reliable and prompt in its action and has the advantage that it can be adapted to stop the machine after the completion of any record, regardless of its length. The mechanism is very easy to operate, since it is only necessary, after placing a new record on the machine, to move the needle arm toward the outer edge of the disk and then toward the inner edge of the disk until the stylus reaches the point at which it is desired to stop the machine. These two movements complete the setting of the stop mechanism and the machine can then be started in the usual way.

If desired the record disks can be provided with marks or devices of any appropriate sort indicating where the records thereon terminate, and thus facilitate the adjustment of the stop mechanism.

The described construction of the mechanism by which it can be adjusted as required for records of different lengths, adapt it for use with the record disks as ordinarily made without any change therein. If, however, specially formed record disks are used having the record grooves on all of the disks terminating at the same distance from the center thereof, there would be no necessity for making the actuating finger F for the releasing arm adjustable, as in such case the stylus and the finger F would always move inwardly to the said point to apply the brake. A stop mechanism having the brake, and brake releasing arm arranged to be operated as described by fingers carried by the needle arm, would, therefore, be useful irrespective of the adjustability of the finger F.

I claim herein as my invention:

1. The combination with an instrument having a driven rotating device and an arm which traverses said rotating device, of stop mechanism for said rotating device comprising a pivoted spring-actuated brake lever adapted to swing on its pivot into and out of engagement with said rotating device, a releasing device pivoted on a stationary part of said instrument, a wheel of relatively large diameter pivoted on said releasing device, said releasing device being adapted to be swung on its pivot to move said wheel into and out of engagement with said brake lever for controlling respectively the releasing and applying of the same, and means operated by said arm for actuating said releasing device, said releasing device and wheel together acting as a toggle mechanism to facilitate the swinging of said brake lever on its pivot, substantially as described.

2. The combination with an instrument having a driven rotating device and an arm which traverses said rotating device, of stop mechanism for said rotating device comprising a pivoted spring-actuated brake lever adapted to swing on its pivot into and out of engagement with said rotating device, a releasing device pivoted on a stationary part of said instrument, a wheel pivoted on said releasing device, said releasing device being adapted to be swung on its pivot to move said wheel into and out of engagement with said brake lever for controlling respectively the releasing and applying of the same, and means operated by said arm for actuating said releasing device, said releasing device and wheel together acting as a toggle mechanism to facilitate the swing of said brake lever on its pivot, substantially as set forth.

3. The combination with an instrument having a driven rotating device and a swinging arm which traverses said rotating device, of stop mechanism for said rotating device comprising a spring-actuated brake, a releasing arm pivoted at one end on a stationary part of said instrument, a wheel pivoted on the other end of said releasing arm, said brake having a face which is substantially concentric with the pivot of said brake releasing arm, said releasing arm being adapted to be swung on its pivot to move said wheel into and out of engagement with said concentric face for controlling respectively the releasing and applying of said brake, the concentric face of the brake being provided with a slightly raised end portion which resists the rolling off of said wheel from said face and means connected to said swinging arm which moves said releasing arm to cause the brake to be released when the swinging arm is moved to commence the operation of said instrument and to cause the brake to be applied, substantially as set forth.

4. The combination with an instrument having a driven rotating device and a swinging arm which traverses said rotating device, of stop mechanism for said rotating device comprising a spring-actuated brake, a releasing arm pivoted at one end on a stationary part of said instrument, a wheel pivoted on the other end of said releasing arm, said releasing arm being adapted to be swung on its pivot to move said wheel into and out of engagement with said brake for controlling respectively the releasing and applying of said brake, the brake being provided with a slightly raised end portion, and means connected to said swinging arm which moves said releasing arm to cause the brake to be applied, substantially as set forth.

5. The combination with an instrument having a driven rotating device, and a swinging arm which traverses said rotating device, of stop mechanism for said rotating device comprising a spring-actuated brake, a releasing arm pivoted at one end on a stationary part of said instrument, a wheel pivoted on the other end of said releasing arm, said brake having a face which is substantially concentric with the pivot of said brake releasing arm, said releasing arm being adapted to be swung on its pivot to move said wheel into and out of engagement with said concentric face for controlling respectively the releasing and applying of said brake, the concentric face of the brake being provided with a slightly raised end portion which resists the rolling off of said wheel from said face, and means connected to said swinging arm which move said releasing arm to a position at which the point of contact of said wheel is beyond the raised position of the concentric face of the brake, to cause the wheel to roll out of engagement with the brake and thereby cause the brake to be applied, substantially as set forth.

6. The combination with an instrument having a driven rotating device and a swinging arm which traverses said rotating device, of stop mechanism for said rotating device comprising a spring-actuated brake, a releasing arm pivoted at one end on a stationary part of said instrument, a wheel pivoted on the other end of said releasing arm, said releasing arm being adapted to be swung on its pivot to move said wheel into and out of engagement with said brake for controlling the releasing of said brake, the brake being provided with a slightly raised end portion, and means connected to said swinging arm which moves said releasing arm to a position at which the point of contact of said wheel is beyond the raised portion of the brake, to cause the wheel to roll out of engagement with the brake and thereby cause the brake to be applied, substantially as set forth.

7. The combination with an instrument having a driven rotating device and a swinging arm which traverses said rotating device, of stop mechanism for said rotating device comprising a brake, a releasing arm which is pivoted at one end on a stationary part of said instrument, a wheel pivoted on the other end of said releasing arm, said brake having a curved face on which said wheel is adapted to engage, and actuating devices carried by the swinging arm which are adapted to engage on opposite sides of said releasing arm and one of which actuates the releasing arm to cause the brake to be released when the swinging arm is moved in one direction, and the other of which actuates the releasing arm to cause the brake to be applied when the swinging arm is moved in the opposite direction, substantially as set forth.

8. The combination with an instrument having a driven rotating device and a swinging arm which traverses said rotating device, of stop mechanism for said rotating device comprising a brake, a releasing arm which is pivoted at one end on a stationary part of said instrument, a wheel pivoted on the other end of said releasing arm, said brake having a face on which said wheel is adapted to engage, and actuating devices carried by the swinging arm which are adapted to engage on opposite sides of said releasing arm and one of which actuates the releasing arm to cause the brake to be released when the swinging arm is moved in one direction, and the other of which actuates the releasing arm to cause the brake to be applied when the swinging arm is moved in the opposite direction, substantially as set forth.

9. The combination with an instrument having a driven rotating device and a swinging device which traverses said rotating device, of stop mechanism for the instrument comprising a stop device and actuating devices which are movable with the swinging device for causing the releasing and applying of said stop device by opposite movements of the swinging device, one of said actuating devices being slidably arranged on the swinging device and adapted to be held in a set position for causing said stop device to be applied to said rotating device at any desired position of said swinging device substantially as set forth.

10. The combination with an instrument having a driven rotating device and a swinging device which traverses said rotating device, of stop mechanism for the instrument comprising a stop device and fingers carried by the swinging device for causing the releasing and applying of said stop device by opposite movements of the swinging device, one of said fingers being slidably arranged on said swinging device and adapted to be held in a set position for causing the stop device to be applied to said rotating device at any desired position of said swinging device, substantially as set forth.

11. The combination with an instrument having a driven rotary device and a swinging device which traverses said rotary device, of stop mechanism for the instrument comprising a stop device, actuating devices which are movable with the swinging device for causing the releasing and applying of said stop device by opposite movements of the swinging device, and one of which is adjustable relatively to the swinging device for regulating the operation of said stop device with respect to the desired movement of said swinging device, and means cooperating with said adjustable device for adjusting the same by the movement of said swinging device, substantially as set forth.

12. The combination with an instrument having a driven rotary device and a swinging device which traverses said rotary device, of stop mechanism for the instrument comprising a stop device, fingers carried by the swinging device for causing said stop device to be released and applied by opposite movements of the swinging device, one of said fingers being adjustable relative to the swinging device for regulating the operation of the said stop device with respect to the desired movement of the swinging device, a latch for holding said adjustable finger during the movement of the swinging device in one direction, means for adjusting said finger by the movement of the swinging device in the opposite direction, and means for actuating said latch to engage and release said adjustable finger, substantially as set forth.

13. The combination with an instrument having a driven rotary device and an arm which traverses said rotary device, of stop mechanism for the rotary device comprising a brake, a releasing device which is movable to cause the brake to be applied and released, fingers projecting from said arm at opposite sides of said releasing device for actuating the same, one of said fingers being adjustable, means for shifting said adjustable finger when the arm is moved in one direction, a latch which is moved by said releasing device to hold said adjustable finger, and means for releasing said latch, substantially as set forth.

14. The combination with an instrument having a driven rotary device and an arm which traverses said rotary device, of stop mechanism for the rotary device comprising a brake, a releasing device which is pivoted to a stationary part of said instrument, a wheel pivoted on said releasing device, said releasing device being adapted to be swung on its pivot to move said wheel into and out of engagement with said brake for causing the releasing and applying thereof, fingers projecting from said arm at opposite sides of said releasing device for actuating the same, one of said fingers being adjustable, means for shifting said adjustable fingers when the arm is moved in one direction, a latch which is moved by said releasing device to hold said adjustable finger, and means for releasing said latch, substantially as set forth.

15. The combination with an instrument having a driven rotating device and a swinging device which traverses said rotating device, of stop mechanism for said rotating device comprising a brake lever, a releasing arm pivoted on a stationary part of said instrument and provided with a wheel of relatively large diameter adapted to roll into and out of engagement with said brake lever for shifting the brake lever for releasing and applying of the brake to said rotating device, said releasing device and wheel together acting as a toggle mechanism to facilitate the shifting of the brake lever, devices movable with said swinging device for actuating said releasing arm, and means for yieldingly holding the wheel of said releasing arm in engagement with said brake lever actuated by one of said movable devices, substantially as set forth.

16. The combination with an instrument having a driven rotating device and an arm which traverses said rotating device, of stop mechanism for said rotating device comprising a spring actuated brake, a releasing arm pivoted at one end on a stationary part of said instrument, a wheel pivoted on the other end of said releasing device, said releasing device being adapted to be swung on its pivot to move said wheel into and out of engagement with the brake for releasing and applying the brake, said brake having a raised portion which resists the rolling off of the wheel from engagement with said brake, and means connected to the swinging arm for moving the releasing device into and out of engagement with the brake, substantially as set forth.

17. An instrument having a driven rotating device in combination with means for stopping the rotation of said device, means for controlling the operation of said stopping device, means consisting of two members movable relative one to the other, one of said parts movable around a fixed pivot, the other part being adapted to engage the stopping means, said parts forming when their axes of movement and the point of engagement with the stopping means are in alinement one with the other, a rigid brace holding the stopping means in inoperative position, and an arm adapted to traverse said rotating device and to change the alinement of one of the pivotal axes of the brace relative to the other axes and the point of bearing of the brace on the stopping means.

18. An instrument having a driven rotating device in combination with spring actuated means for stopping said device, a brace consisting of two parts or members one movable around a fixed pivot and having the other pivotally connected to it, said parts being adapted when shifted to a position where their pivotal axes are in alinement with the point of contact of the second member with the stopping means to hold the latter in inoperative position, and an arm adapted to traverse the rotating device and in its movement shift the pivotal connection between said members out of alinement of the other pivotal axis and point of contact with the stopping means.

19. An instrument having a driven rotating device in combination with a brake lever subjected to pressure tending to cause the lever to engage the rotating device, a brace consisting of two parts or members pivotally connected, one of said members being movable around a fixed pivot, said brace being adapted to be shifted to a position where its pivotal axes will coincide with a line bisecting the brake lever at a point intermediate its end and center of movement, and an arm adapted to traverse the rotating device and in its movement to move one of its pivotal points out of line bisecting the lever.

In testimony whereof I have hereunto set my hand this 2nd day of July, 1914.

GEO. H. TAGGART.

Witnesses:

HOWELL C. PERRIN,
AMY ZAHN.